(12) United States Patent
Kanehira et al.

(10) Patent No.: US 6,416,436 B1
(45) Date of Patent: Jul. 9, 2002

(54) SILENT CHAIN POWER TRANSMITTING DEVICE

(75) Inventors: Makoto Kanehira; Kazumasa Matsuno; Hitoshi Ohara; Shigekazu Fukuda; Hiroshi Horie; Takayuki Funamoto; Yoshihiro Kusunoki; Masao Maruyama, all of Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/620,551

(22) Filed: Jul. 21, 2000

(30) Foreign Application Priority Data

Jul. 22, 1999 (JP) .......................................... 11-207783

(51) Int. Cl.$^7$ .............................................. F16G 13/04
(52) U.S. Cl. ...................................... 474/212; 474/213
(58) Field of Search ................................ 474/213, 212, 474/156, 157, 206, 215, 217, 152, 148, 216, 161, 160, 153, 202, 205

(56) References Cited

U.S. PATENT DOCUMENTS 4,758,210 A * 7/1988 Ledvina ...................... 474/212
5,921,878 A * 7/1999 Young ......................... 474/160
5,976,045 A * 11/1999 Young ......................... 474/160
6,179,741 B1 * 1/2000 Young ......................... 474/161

FOREIGN PATENT DOCUMENTS

JP 159829 * 7/1987
JP 234651 * 8/2000

* cited by examiner

Primary Examiner—Lenard A. Footland
Assistant Examiner—Marcus Charles
(74) Attorney, Agent, or Firm—Howson & Howson (57) ABSTRACT

A silent chain power transmitting device includes a driving sprocket and at least one drive sprocket, and a silent chain stretched over the driving and driven sprockets to provide a tension run and a slack run on opposite sides of the driving sprocket. The driving and driven sprockets have a sprocket pitch (chordal pitch) designed to become substantially equal to a chain pitch of the tension run of the silent chain while operating under load. By thus designing the sprocket pitch relative to the chain pitch, toothed link plates of the silent chain are smoothly guided into sliding contact with teeth of the sprockets without causing objectionable interference or collision. The sprockets and silent chain are substantially free from abnormal wear and hence have an increased degree of durability.

10 Claims, 5 Drawing Sheets

SILENT CHAIN POWER TRANSMITTING DEVICE

BACKGROUND OF THE INVENTION

1. Field of the Invention

The present invention relates generally to a silent chain power transmitting device in which a silent chain and sprockets are in mesh with each other for power transmitting operation, and more particularly to such a silent chain power transmitting device which is particularly suitable for use in an automobile for driving a camshaft and an auxiliary device of an engine, a transmission, a transfer box, etc.

2. Description of the Related Art

A conventional silent chain power transmitting device includes a silent chain which is formed by articularly connecting together a number of link plates in an endless fashion. The silent chain is stretched over two sprockets spaced at a predetermined center distance on shafts. While a predetermined tensile load is applied to the silent chain, the chain length is measured for inspection to determine whether or not the measured or inspected silent chain is acceptable in view of a predetermined product standard. The predetermined tensile load is a tensile load so determined as to produce a load tension which is about ⅕ to ⅒ of an allowable maximum load tension of the silent chain and which is smaller than a load tension applied to the silent chain during normal use. A chain pitch of the thus obtained (accepted) silent chain is within a dimensional tolerance which is set to deviate from a reference value specified by, for example, a product standard, toward the "plus" or positive side of the reference value. This means that the chain pitch has a lower tolerance limit equal to the reference value and an upper tolerance limit greater than the reference value.

On the other hand, the sprockets used in the conventional silent chain power transmitting device have a diameter produced with a dimensional tolerance which is set to deviate from a reference value specified by, for example, the produce standard toward the "minus" or negative side of the reference value, Thus, a sprocket pitch (chordal pitch) of the sprocket has a dimensional tolerance which is set to deviate from a reference value specified by the product standard toward the "minus" or negative side of the reference value. This means that the sprocket pitch (chordal pitch) of the sprockets has an upper tolerance limit equal to the reference value and a lower tolerance limit less than the reference value.

In the conventional power transmitting device, however, partly because the chain pitch of an actually produced silent chain is likely to become greater than a reference value due to a tolerance set to deviate from the reference value toward the positive side of the reference value, partly because the sprocket pitch (chordal pitch) of actually produced sprockets is likely to become smaller than a reference value due to a tolerance set to deviate from the reference value toward the negative side of the reference value, and partly because the silent chain is subjected to a load tension tending to elongate the chain pitch during use of the silent chain transmitting device, the chain pitch of the silent chain while in use becomes greater than the sprocket pitch (chordal pitch) of the sprockets.

Thus, when a bifurcated tooth-like engagement surface of each link plate of the silent chain starts to mesh with a toothed surface of each of the sprockets, mutual interference or collision occurs between the tooth-like engagement surface of the link plate and the sprocket tooth and mutually causes abnormal wear of the link plates and sprockets. In addition, connecting pins used for articulately connecting the adjacent link plates are subjected to undue loads, tending to shorten the lifetime of the silent chain and the sprockets. Another problem is that, at the onset of meshing engagement between the link plates of the silent chain and the sprockets, impact or collision sound is produced.

SUMMARY OF THE INVENTION

With the foregoing drawbacks of the prior art in view, it is an object of the present invention to provide a sprocket for use in a silent chain power transmitting device and a silent chain power transmitting device including such sprocket, which are capable of preventing abnormal wear caused due to interference or collision between the sprocket and a silent chain at the onset of meshing engagement therebetween, thereby improving the durability of the silent chain power transmitting device, and which is also capable of preventing generation of impact sound caused due to the aforesaid interference, thereby lowering the level of operation noise (sliding noise) of the silent chain power transmitting device.

Another object of the present invention is to provide a sprocket for a silent chain power transmitting device and a silent chain power transmitting device including such sprocket, which have an increased number of sprocket teeth engaged in bearing a load applied on a silent chain during power transmitting operation, thereby increasing the durability of the sprocket and the silent chain.

In one aspect the present invention provides a sprocket for use in a silent chain power transmitting device including a silent chain trained around the sprocket so as to provide a tension run and a slack run on opposite sides of the sprocket, wherein the sprocket has a chordal pitch designed to become substantially equal to the chain pitch of the tension run of the silent chain while operating under load.

In another aspect the present invention provides a silent chain power transmitting device comprising a driving sprocket and at least one drive sprocket, and a silent chain stretched over the driving and driven sprockets to provide a tension run and a slack run on opposite sides of the driving sprocket, wherein driving and driven sprockets have a chordal pitch designed to become substantially equal to the chain pitch of the tension run of the silent chain while operating under load.

It is important to note that the foregoing passage reciting that the sprocket or sprockets have "a chordal pitch designed to become substantially equal to the chain pitch of the tension run of the silent chain" means that the difference, if any, between the chain pitch of the tension run of the silent chain and the chordal pitch of the sprocket/sprockets is within a dimensional tolerance of the chordal pitch of the sprockets.

When the silent chain power transmitting device is operating, the tension run of the silent chain is forced to move from the driven sprocket to the driving sprocket, and the slack run of the silent chain is returned from the driving sprocket to the driven sprocket.

Since the chordal pitch of the sprocket is designed to become substantially equal to the chain pitch of the tension run of the silent chain while operating under loaded condition, link plates which are articulately connected together to form the silent chain are smoothly guided into sliding contact with teeth of the sprocket without causing objectionable interference or collision. By thus smoothly guiding the link plates relative to the sprocket teeth, it is possible not only to prevent generation of impact or collision sound at the onset of meshing engagement between the chain and the sprockets, but also reduce sliding noise of the silent chain during operation.

At a circumferential portion of the sprocket around which the silent chain is wrapping, a load applied to the silent chain during power transmitting operation is shared or borne by an increased number of successive sprocket teeth spaced at a chordal pitch substantially equal to the chain pitch of the chain tension run. It is, therefore, possible to reduce bending forces or loads acting on the individual sprocket teeth and reduce a load to be shared borne by the sprocket tooth which comes first into meshing engagement with the silent chain.

When the silent chain is operating under load condition, the slack run of the silent chain has a chain pitch smaller than the chordal pitch of the sprocket because the slack run is not stretched or otherwise tensioned and is allowed to become loose due to a cumulative elongation of the tension run gathered at the slack run. However, since the silent chain essentially has high elongation rigidity, the chain pitch of the slack run does not decrease to such an extent that meshing engagement between the silent chain and the sprockets is hindered.

BRIEF DESCRIPTION OF THE DRAWINGS

A certain preferred embodiment of the present invention will now be described in detail, by way of example only, with reference to the accompanying drawings, in which.

DETAILED DESCRIPTION OF THE PREFERRED EMBODIMENT

The following description is merely exemplary in nature and is in no way intended to limit the invention or its application or uses.

Figure 3:
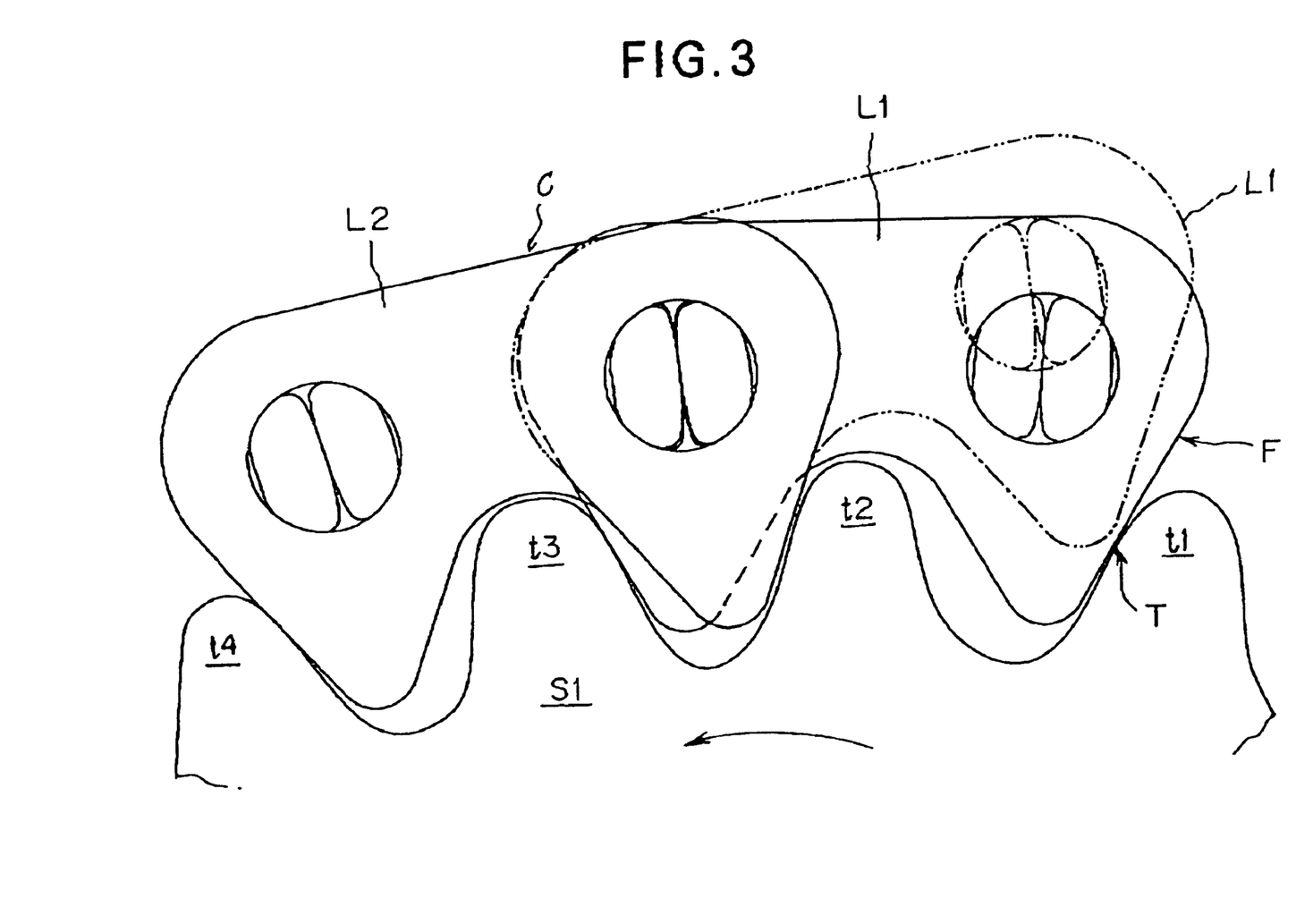
FIG. 3 is an enlarged fragmentary front elevational view of a silent chain power transmitting device according to the present invention, showing the manner in which a silent chain and a sprocket are in mesh with each other.
Figure 4:
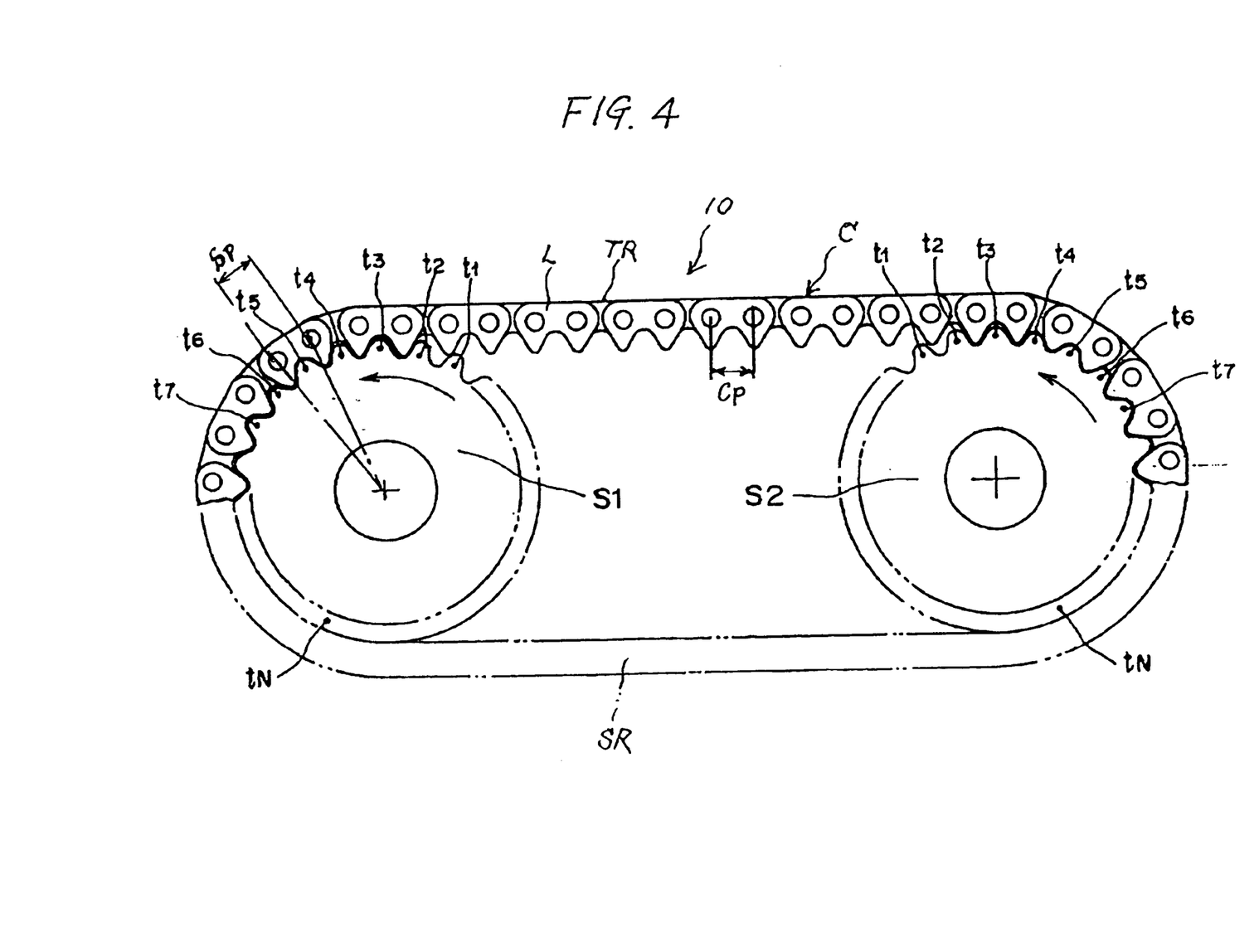
FIG. 4 is a diagrammatical view illustrative of the manner in which the silent chain meshes with a drive sprocket and a driven sprocket according to the present invention.

Referring now to the drawings and FIG. 4 in particular, there is shown a silent chain power transmitting device 10 according to an embodiment of the present invention. The silent chain power transmitting device 10 is a double axis power transmitting mechanism comprised of a silent chain C and two sprocket S1 and S2 over which the silent chain C is stretched. The silent chain C is formed of a large number of link plates L articulately connected together in both a longitudinal direction and a transverse direction of the chain by means of pivot pins PN. (FIG. 1) Each of the link plates L has a pair of teeth formed on one side thereof, each tooth having inside and outside flanks F (FIG. 3) converging together at a tip T (FIG. 3) of the tooth. The sprocket S1 is a driving sprocket secured to, for example, a crankshaft (not shown) of an engine, and the sprocket S2 is a driven sprocket secured to, for example, a camshaft (not shown) of the engine. The silent chain C stretched over the driving and driven sprockets S1, S2 provides a tension run TR and a slack run SR on opposite sides of the driving sprocket S1.

The driving and driven sprockets S1 and S2 are designed such that sprocket pitch (chordal pitch) Sp of the sprockets S1, S2 becomes substantially equal to a chain pitch Cp of the tension run TR of the silent chain C when the silent chain C is running or otherwise operating under loaded condition. In other words, the sprockets S1, S2 are designed such that the difference between the sprocket pitch (chordal pitch) Sp of the sprockets S1, S2 and the chain pitch Cp of the tension run TR of the silent chain C while operating under loaded condition is within a dimensional tolerance Es of the sprocket pitch (chordal pitch) Sp. The aforesaid relation between the sprocket pitch Sp and the chain pitch Cp is represented by the following Expression (1).

$$Sp-Cp=Es \quad (1)$$

where Sp: sprocket pitch, Es: dimensional tolerance of the sprocket pitch Sp, and Cp: chain pitch of the tension run TR of the silent chain C while operating under load.

The dimensional tolerance Es of the sprocket pitch Sp is represented by a dimensional tolerance of an outside diameter of a toothed surface of each sprocket S1, S2. A typical example of such outside diameter is a so-called "over-pin diameter (OPD)" which is obtained by a measurement made over pins or balls inserted in two diametrically opposite tooth spaces of the sprocket S1, S2. The dimensional tolerance Es is appropriately set according to manufacturing accuracy of the sprockets S1, S2. For instance, for a sprocket (for silent chain power transmitting devices) having a diameter of 100 mm, it is sufficient to provide a dimensional tolerance Es of about ±0.15 mm. A more smaller dimensional tolerance may be employed when a more precise manufacturing accuracy can be achieved.

The chain pitch Cp of the tension run TR of the silent chain C while operating under load is obtained in accordance with the following Expression (2).

$$Cp=P0+A\cdot Ec+\delta p \quad (2)$$

where P0: reference chain pitch, A: constant, Ec: dimensional tolerance of the chain pitch P, and δp: elongation per pitch of the chain measured at the tension run TR of the silent chain C while operating under load.

Figure 1:
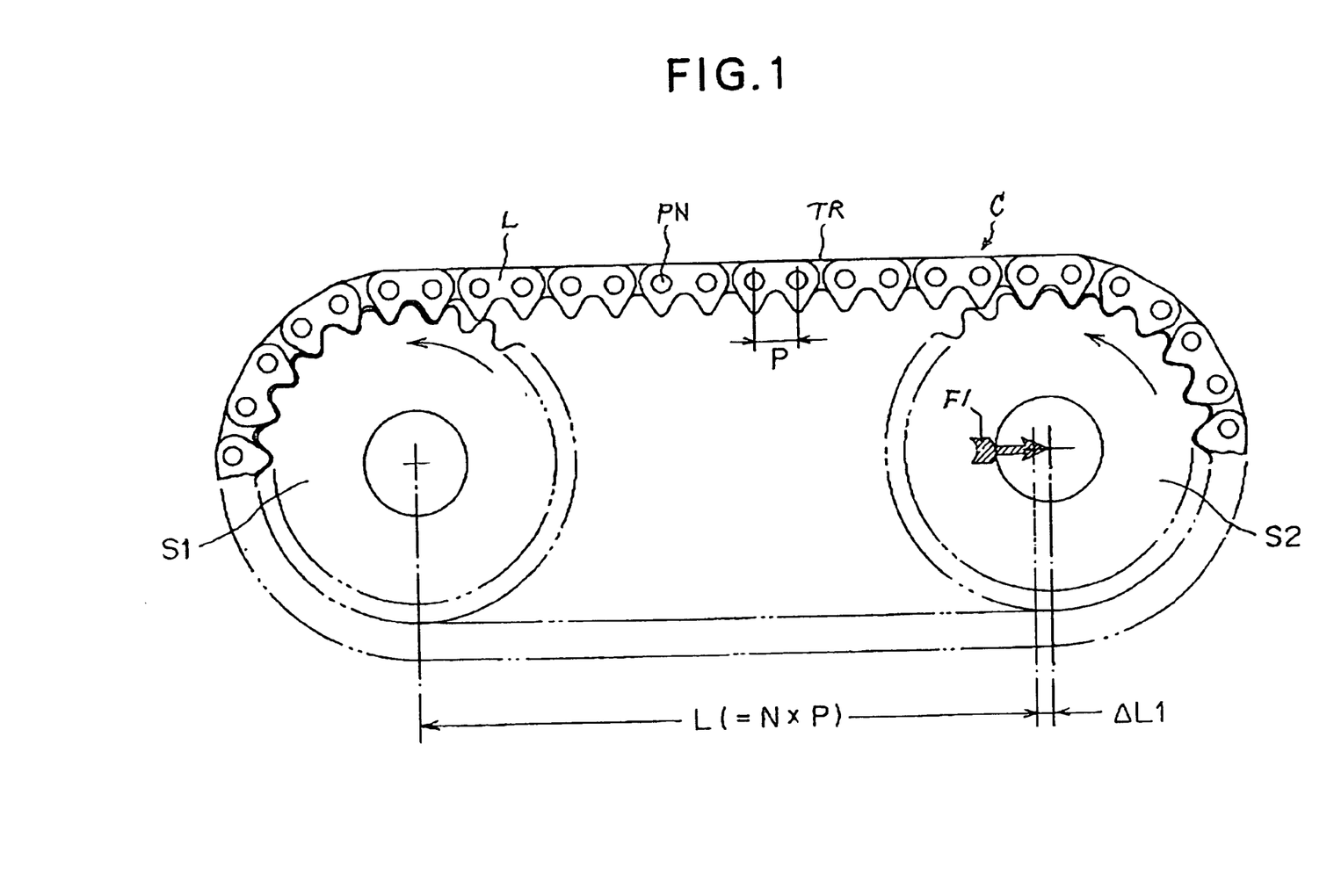
FIG. 1 is a diagrammatical view showing the manner in which the length of a silent chain is measured.

The dimensional tolerance Ec of the chain pitch P and the elongation per pitch δp of the chain measured at the tension run TR of the silent chain C while operating under load are obtained by a measurement made on a similar silent chain power transmitting device shown in FIG. 1.

As understood from FIG. 1, the dimensional tolerance Ec of the chain pitch P is obtained in accordance with the following Expression (3).

$$Ec=\Delta L1/N \quad (3)$$

where ΔL1: variation of the center distance between sprocket axes when the silent chain C is subjected to a tensile load F1 prescribed by an inspection standard of the silent chain, and N: number of link plates I existing within the center distance between sprocket axes.

Figure 2:
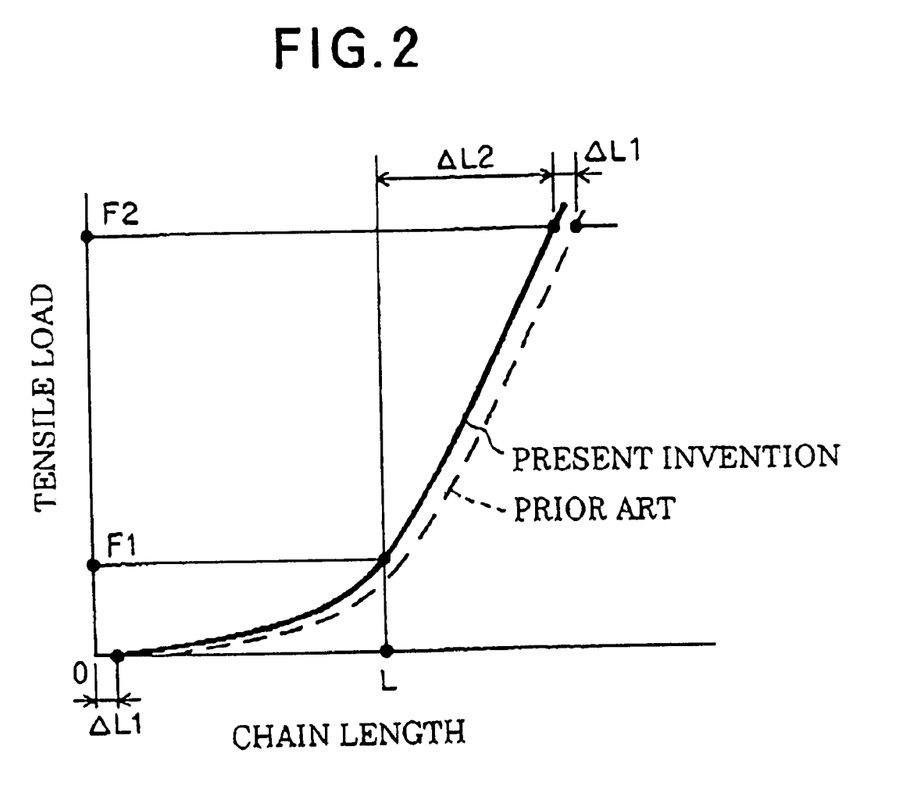
FIG. 2 is a graph showing the relationship between the tensile load and the chain length of the silent chain.

The elongation per pitch δp of the chain measured at the tension run TR of the silent chain C while operating under load is obtained in accordance with the following Expression (4).

$$\delta p=\Delta L2/N \quad (4)$$

where ΔL2: variation of the center distance between sprocket axes measured when the silent chain C shown in FIG. 1 is subjected to a tensile load F2 (not shown) applied when the silent chain is operating under load and N: as specified above. The tensile load F2 is greater than the tensile load F1. The relationship between the tensile loads F1, F2, and the variations ΔL1, ΔL2 is shown in FIG. 2. In FIG. 2 a solid-lined curve indicates a chain length versus tensile load characteristic of the silent chain according to the present invention, and a broken-lined curve indicates a chain length versus tensile load characteristic of the conventional silent chain.

In the Expression (2), the constant A is set to be 0.5 because due to articulate connection of the link plates L by means of the pivot pins PN, the dimensional tolerance Ec of the chain pitch P tends to vary abruptly; and in view of this, a mean value of the thus variable dimensional tolerance Ec is adopted for calculating the chain pitch Cp.

In the silent chain power transmitting device 10 (FIG. 4) of the present invention, the sprocket pitch Sp represented by a chordal pitch of the sprockets S1, S2 is made to become substantially equal to the chain pitch Cp of the tension run TR of the silent chain C. With this arrangement, when the silent chain C and the driving sprocket S1 mesh each other, as shown in FIG. 3, interference or collision of the tooth tip T or the flank F of each link plate L (L1) relative to a tooth t1 of the sprocket S1 can be avoided. The tooth tip T and flank F of the link plate L1 are smoothly guided to slide along a surface of the tooth t1 of the driving sprocket S1, so that the sliding resistance of the link plate L1 relative to the sprocket tooth t1 can be reduced.

As discussed previously, in the conventional silent chain power transmitting device, the sprocket pitch of the sprockets is made smaller than the chain pitch of the tension run of the silent chain while operating under loaded condition. In other words, the chain pitch is greater than the sprocket pitch. Accordingly, when the silent chain and the sprocket mesh each other in the like manner as shown in FIG. 3, a tooth tip and a flank of each toothed link plate of the conventional silent chain are displaced in position toward the right-hand direction in FIG. 1 with respect to those of the present invention, so that interference or collision occurs between the tooth tip and flank of the conventional silent chain and the sprocket tooth t1. On the contrary, in the silent chain power transmitting device 10 according to the present invention, the sprocket pitch (chordal pitch) Sp is designed to become substantially equal to the chain pitch Cp of the tension run TR of the silent chain C. By thus designing the sprocket pitch Sp relative to the chain pitch Cp, it becomes possible to not only prevent generation of impact or collision sound at the onset of meshing engagement between the toothed link plates L of the silent C chain and the teeth of the driving and driven sprockets S1, S2, but also lower sliding noise during operation. In addition, the silent chain C and the sprockets S1, S2 are substantially free from abnormal wear and hence have an increased degree of durability.

Reference is now made to FIG. 4 which illustrates the manner in which the silent chain C meshes with the driving and driven sprocket S1, S2 of the silent chain power transmitting device 10 of the present invention. When the power transmitting device 10 is operating, the tension run TR of the silent chain C is forced to move from the driven sprocket 32 toward the driving sprocket S1. Accordingly, the tension run TR is pulled or stretched toward the driving sprocket S1 and hence subjected to a tensile load. The slack run SR of the silent chain C is returned from the driving sprocket S1 to the driven sprocket S2 and allowed to sag or become loose.

Figure 5:
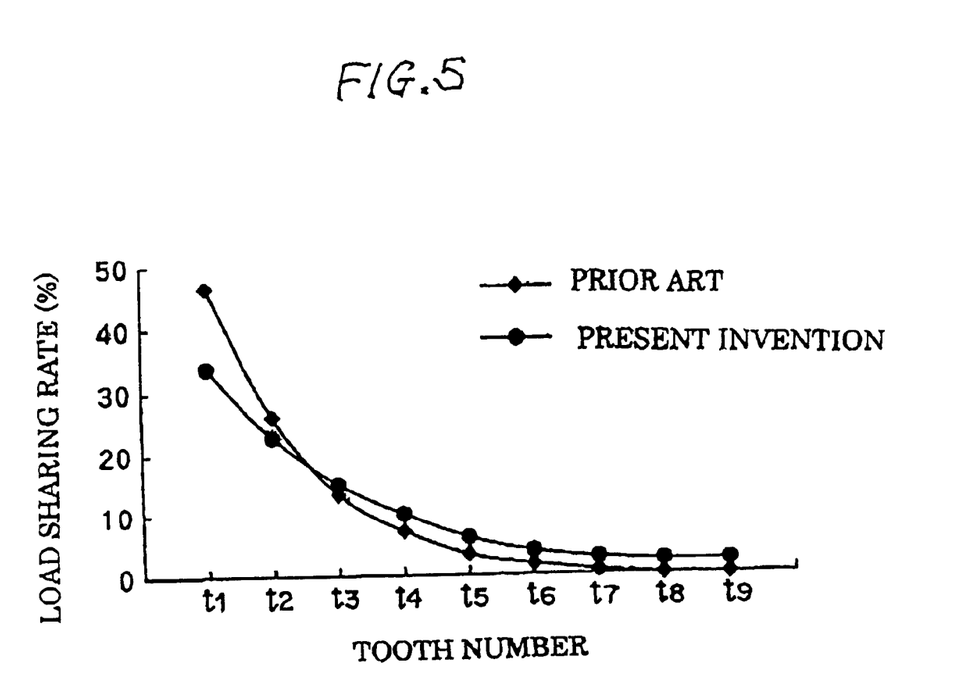
FIG. 5 is a graph showing the load sharing rate of the sprocket teeth of the present invention as compared to that of a conventional silent chain power transmitting device.

FIG. 5 is a graphical illustration of the load sharing rate of the sprocket teeth of the present invention as compared to that of the conventional silent chain power transmitting device (prior art). In FIG. 5, the horizontal axis represents the sprocket teeth t1–tN (t9) as numbered in sequence of meshing engagement relative to the toothed link plates L of the silent chain C, and the vertical axis represents the load sharing rates (%) of the respective sprocket teeth tN (t9). The sprocket teeth t1–tN correspond to those t1–tN shown in FIG. 4.

It appears clear from FIG. 5 that the number of sprocket teeth engaged in bearing a load on the silent chain during power transmitting operation is larger in the sprockets S1, S2 of the present invention than in those of the prior art. In addition, the load bearing rate of the sprocket teeth of the present invention varies more gently than that in the prior art, and a considerably reduction in the load bearing rate is achieved at the first sprocket tooth t1. This means that due to an increased number of sprocket teeth engaged in bearing the load on the silent chain C while in operation, bending forces acting on the respective sprocket teeth can be reduced. Thus, the sprockets S1, S2 are substantially free the problem of broken teeth.

As described above, the sprocket pitch (chordal pitch) of driving and driven sprockets of the present invention is designed to become substantially equal to a chain pitch of the tension run of a silent chain. With this arrangement, at the onset of meshing engagement, toothed link plates of the silent chain can be smoothly guided into sliding contact with teeth of the sprockets without causing objectionable interference or collision. It is, therefore, possible to not only prevent generation of impact sound, but also lower sliding noise of the silent chain during operation. Furthermore, the silent chain and the sprockets are substantially free from abnormal wear and hence have an increased degree of durability.

At a circumferential portion of each sprocket around which the silent chain is wrapping, a load applied to the silent chain during power transmitting operation is borne by a larger number of sprocket teeth than that in the prior art. Accordingly, the individual sprocket teeth are subjected to smaller bending forces or loads than the prior art sprocket teeth and hence they are unlikely to break.

The diameter and the number of teeth of the driving and driven sprockets should by no means be limited to those shown in the illustrated embodiment but may be determined appropriately. In addition, the silent chain power transmitting device may be constructed to include more than one idler sprocket in addition to the driving and driven sprockets.

Obviously, various minor changes and modifications of the present invention are possible in the light of the above teaching. It is therefore to be understood that within the scope of the appended claims, the present invention may be practiced otherwise than as specifically described.

What is claimed is:

1. A silent chain power transmitting device including a sprocket and a silent chain trained around the sprocket so as to provide a tension run and a slack run on opposite sides of said sprocket when the chain is traveling around the sprocket under load, wherein the tension run of the silent chain has a chain pitch which varies in dependence or the load in the tension run, and the value of the chordal pitch of the sprocket is such that the chain pitch of the tension run of said silent chain becomes substantially equal to the value of the chordal pitch of the sprocket while the silent chain power transmitting device is operating with said tension run under load, and wherein the value of said chordal pitch of the sprocket has a dimensional tolerance, and the difference between said chain pitch of the tension run of the silent chain and said chordal pitch of the sprocket is within said dimensional tolerance of the chordal pitch of the sprocket.

2. A device according to claim 1, wherein the chain pitch of said tension run of the silent chain while the tension run is under load is defined by $$Cp = P0 + A \cdot Ec + \delta P,$$

where:

Cp is the chain pitch of the tension run,

P0 is a reference chain pitch,

A is a constant,

Ec is the dimensional tolerance of the chain pitch, and

δP is the elongation per pitch of the chain measured along the tension run of the chain while said tension run is operating under load.

3. A device according to claim 2, wherein the per pitch elongation δP of the chain along the tension run while operating under load is defined by:

$$\delta P = \Delta L2/N$$

where:

ΔL2 is the variation of the center distance between the axes of said sprockets when the silent chain is subjected to a predetermined tensile load applied when the silent chain is operating under load, and N is the number of link plates in the tension run within a distance equal to the center distance between the sprocket axes.

4. A device according to claim 2, wherein the chain is composed of link plates and is wound around a pair of sprockets, including said sprocket, and wherein the dimensional tolerance Ec of the chain pitch is defined by $$Ec = \Delta L1/N$$

where:

ΔL1 is the variation of the center distance between the axes of said sprockets when the silent chain is subjected to a predetermined tensile load in accordance with an inspection standard, and N is the number of link plates in the tension run within a distance equal to the center distance between the sprocket axes.

5. A device according to claim 4, wherein the per pitch elongation δP of the chain along the tension run while operating under load is defined by:

$$\delta P = \Delta L2/N$$

where:

ΔL2 is the variation of the center distance between the axes of said sprockets when the silent chain is subjected to a second predetermined tensile load applied when the silent chain is operating under load, said second predetermined tensile load being greater than said predetermined tensile load in accordance with an inspection standard, and N is the number of link plates in the tension run within a distance equal to the center distance between the sprocket axes.

6. A silent chain power transmitting device comprising:

a driving sprocket and at least one driven sprocket; and a silent chain stretched over said driving and driven sprockets to provide a tension run and a slack run on opposite sides of said driving sprocket when the silent chain is traveling around the sprockets under load, wherein said tension run of the silent chain has a chain pitch which varies in dependence on the load on the tension run, and wherein the value of the chordal pitch of said driving and driven sprockets is such that said chain pitch of the tension run of said silent chain becomes substantially equal to the value of said chordal pitch of the sprockets while the silent chain power transmitting device is operating with said tension run under load, and wherein the value of said chordal pitch of the sprockets has a dimensional tolerance, and the difference between said chain pitch of the tension run of the silent chain and said chordal pitch of the sprockets is within said dimensional tolerance of the chordal pitch of the sprockets.

7. A device according to claim 6, wherein the chain pitch of said tension run of the silent chain while the tension run is under load is defined by $$Cp = P0 + A \cdot Ec + \delta P,$$

where:

Cp is the chain pitch of the tension run,

P0 is a reference chain pitch,

A is a constant,

Ec is the dimensional tolerance of the chain pitch, and

δP is the elongation per pitch of the chain measured along the tension run of the chain while said tension run is operating under load.

8. A device according to claim 7, wherein the per pitch elongation δP of the chain along the tension run while operating under load is defined by:

$$\delta P = \Delta L2/N$$

where:

ΔL2 is the variation of the center distance between the axes of said sprockets when the silent chain is subjected to a predetermined tensile load applied when the silent chain is operating under load, and N is the number of link plates in the tension run within a distance equal to the center distance between the sprocket axes.

9. A device according to claim 7, wherein the dimensional tolerance Ec of the chain pitch is defined by $$Ec = \Delta L1/N$$

where:

ΔL1 is the variation of the center distance between the axes of said sprockets when the silent chain is subjected to a predetermined tensile load in accordance with an inspection standard, and N is the number of link plates in the tension run within a distance equal to the center distance between the sprocket axes.

10. A device according to claim 9, wherein the per pitch elongation δP of the chain along the tension run while operating under load is defined by:

$$\delta P = \Delta L2/N$$

where:

ΔL2 is the variation of the center distance between the axes of said sprockets when the silent chain is subjected to a second predetermined tensile load applied when the silent chain is operating under load, said second predetermined tensile load being greater than said predetermined tensile load in accordance with an inspection standard, and N is the number of link plates in the tension run within a distance equal to the center distance between the sprocket axes.

* * * * *

UNITED STATES PATENT AND TRADEMARK OFFICE
CERTIFICATE OF CORRECTION

PATENT NO.    : 6,416,436 B1
DATED         : July 9, 2002
INVENTOR(S)   : Makoto Kanehira et al.

It is certified that error appears in the above-identified patent and that said Letters Patent is hereby corrected as shown below:

Column 3,
Line 2, change "reduce" to -- to reduce --;
Line 11, change "reduce" to -- to reduce --
Line 11, insert -- or -- before "borne";
Line 13, delete "condition";

Column 4,
Line 53, change "I" to -- L --;
Line 61, change "ΔL2" to -- ΔL1 --;

Column 5,
Line 53, change "32" to -- S2 --;

Column 6,
Line 12, change "freethe" to -- free from the --;
Line 49, change "or" to -- on --.

Signed and Sealed this

Thirty-first Day of December, 2002

JAMES E. ROGAN
*Director of the United States Patent and Trademark Office*